US007436971B2

(12) United States Patent
Terada et al.

(10) Patent No.: US 7,436,971 B2
(45) Date of Patent: Oct. 14, 2008

(54) MIXING SIGNAL-PATH SETTING APPARATUS AND PROGRAM

(75) Inventors: Kotaro Terada, Hamamatsu (JP); Kei Nakayama, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 689 days.

(21) Appl. No.: 10/635,801

(22) Filed: Aug. 5, 2003

(65) Prior Publication Data

US 2004/0028248 A1 Feb. 12, 2004

(30) Foreign Application Priority Data

Aug. 5, 2002 (JP) ............................ 2002-227028

(51) Int. Cl.
*H04B 1/00* (2006.01)
*H02B 1/00* (2006.01)
*H04R 27/00* (2006.01)

(52) U.S. Cl. .......................... 381/119; 381/82; 381/123

(58) Field of Classification Search ................. 381/119, 381/118, 123, 82, 83, 85, 2; 700/94; 369/1-5; 348/722
See application file for complete search history.

(56) References Cited

U.S. PATENT DOCUMENTS 3,781,452 A 12/1973 Vauclain
4,224,644 A 9/1980 Lewis et al.
4,509,190 A 4/1985 Spector
5,225,618 A 7/1993 Wadhams
5,454,041 A * 9/1995 Davis ......................... 381/119
5,602,358 A 2/1997 Yamamoto
5,852,800 A 12/1998 Modeste et al.
6,141,484 A 10/2000 Nagasawa et al.
6,507,657 B1 1/2003 Kamada et al.

(Continued)

FOREIGN PATENT DOCUMENTS

JP 60-015858 1/1985

(Continued)

OTHER PUBLICATIONS

Korg USA Inc., D8 Digital Recording Studio, Apr. 22, 1999, Wayback Machine Internet Archive, http://www.web.archive.org/web/19990422004251/www.korg.com/d8v3.cfm, pp. 1-2.

(Continued)

*Primary Examiner*—Vivian Chin
*Assistant Examiner*—Douglas Suthers
(74) *Attorney, Agent, or Firm*—Morrison & Foerster LLP

(57) ABSTRACT

One or more input channels are selected from among a plurality of input channels, and signals of the selected one or more input channels are mixed into a first output channel. A particular input channel to be excluded from the plurality of input channels is set as desired. Then, a setting is made such that the signals of the selected one or more input channels, having the signal of particular input channel excluded therefrom, are mixed into a second output channel. To the first output channel are set such signal paths as to allow mixing of all the signals of the selected one or more input channels. To the second output channel are set such signal paths as to allow mixing of the signals of the selected one or more input channels with the signal of the particular input channel excluded therefrom.

13 Claims, 5 Drawing Sheets

U.S. PATENT DOCUMENTS

| | | | |
|---|---|---|---|
| 6,959,220 | B1 | 10/2005 | Wiser et al. |
| 2003/0028273 | A1 | 2/2003 | Lydecker et al. |

FOREIGN PATENT DOCUMENTS

| | | |
|---|---|---|
| JP | 3-141799 | 6/1991 |
| JP | 5-304443 | 11/1993 |
| JP | 7-297799 | 11/1995 |
| JP | 7-307078 | 11/1995 |
| JP | 8-076763 | 3/1996 |
| JP | 8-124296 | 5/1996 |
| JP | 10-268882 | 10/1998 |
| JP | 10-322799 | 12/1998 |
| JP | 11-194765 | 7/1999 |
| JP | 2000-194358 | 7/2000 |

OTHER PUBLICATIONS

Korg Digital Recording Studio D8, Owner's Manual.

Roland Corporation, "VS-1680 Owner's Manual," copyright 1998, Roland Corp., pp. 1-214.

* cited by examiner

MIXING SIGNAL-PATH SETTING APPARATUS AND PROGRAM

BACKGROUND OF THE INVENTION

The present invention relates generally to a mixing signal-path setting apparatus and mixing signal-path setting program for setting signal paths for a system that mixes signals of a plurality of channels. The present invention is particularly suitable for application to audio mixers that mix audio signals of a plurality of channels after processing the audio signals.

The audio mixers (audio mixing systems) are constructed to mix audio signals (e.g., voice signals and/or tone signals) of two or more input channels, designated by a human operator from among a plurality of input channels, and then output the thus-mixed audio signals to output channels designated by the human operator from among a plurality of output channels.

The conventional audio mixers for use in broadcasting studios have a so-called "mix-minus" function. Announcer inputs his or her voices to a microphone while monitoring sounds having been mixed together. However, if the announcer is away from the installed position of the audio mixer, the announcer would feel it difficult to speak because, in such a case, his or her voices are heard with considerable time delays. Thus, the above-mentioned "mix-minus" function is used to allow the announcer to monitor sounds with only his or her voices excluded therefrom.

Also, as regards audio mixers used mainly in halls (e.g., auditoriums) and event venues (sites), use of the "mix-minus" function can solve a similar problem, for example, in a case where they are used for broadcasting purposes.

Generally, the conventional audio mixers for use in broadcasting studios perform the "mix-minus" function using a dedicated circuit that subtracts signals of announcer's voices from signals having been temporarily mixed together completely. Therefore, the conventional audio mixers are disadvantageous in that they separately require the dedicated circuit and in that signals output from the audio mixers tend to have quality degradation or deterioration.

The conventional audio mixers used in halls and event venues, on the other hand, include a multiplicity of signal input and output terminals. Therefore, these audio mixers have a highly-flexible signal path setting function for coupling the input channels to the output channels. So, there have been studied more sophisticated approaches for implementing the mix-minus function using the signal path setting function.

FIG. 5 is a system block diagram of an audio mixer conventionally used in a hall or event venue. In the figure, components not pertinent to the present invention are omitted for simplicity.

In FIG. 5, reference numeral 51 represents a microphone input card, which includes analog input terminals for taking in analog signals from a microphone, a built-in head amplifier and an analog-to-digital (A/D) converter. 52 represents a line input card, which includes input terminals for inputting analog signals and an A/D converter. 53 represents a digital input card, which includes input terminals for inputting digital signals. Any desired one of or a desired combination of these input cards is mounted in a box. Throughout this patent specification, the term "card" means a card-type device having a built-in electronic circuit.

54 represents an input patch section, which selectively couples individual input signals from the above-mentioned cards to input channels of an input channel processing section 55. The input channel processing section 55 adjusts the sound volume, quality, etc. of the input signal of each of the input channels, and selectively couples the input signals, before or after the adjustment of the sound volume, quality, etc., to given buses of a mixing bus unit or stereo bus unit 57. For example, the mixing bus unit 56 includes buses MIX1 to MIX48, and the stereo bus unit 57 includes buses STEREO L and STEREO R.

Mix output channel processing section 59 is connected with corresponding buses of the mixing bus unit 56. The processing section 59 receives mixed results of the signals of the input channels coupled to the corresponding mixing buses, then adjusts the sound volume, quality, etc. of the mixed signals, and outputs the thus-adjusted mixed signals to an output patch section 60. Stereo output channel processing section 58, on the other hand, is connected to corresponding buses (STEREO L and STEREO R) of the stereo bus unit 57. The stereo output channel processing section 58 receives mixed results of the input signals of the input channels coupled to the corresponding stereo buses, then adjusts the sound volume etc. of the mixed signals, and outputs the thus-adjusted mixed signals to the output patch section 60.

The mixing buses MIX1 to MIX48 correspond to the mix output channels, while the stereo buses STEREO L and STEREO R correspond to the stereo output channels.

The output patch section 60 selectively supplies the output signals from the mix output channel processing section 59 and stereo output channel processing section 58 to given ones of succeeding output terminals. Reference numeral 61 represents an analog output card which includes a digital-to-analog (D/A) converter and analog output terminals. 62 represents a digital output card which includes digital output terminals.

SUMMARY OF THE INVENTION

In view of the foregoing, it is an object of the present invention to provide an improved mixing signal-path setting apparatus and mixing signal-path setting program which can use an existing or conventional signal path setting function to perform a function of outputting mixed signals with a signal of a particular input channel excluded therefrom.

In order to accomplish the above-mentioned object, the present invention provides a mixing signal-path setting apparatus for making a setting such that signals of one or more input channels, selected from among a plurality of input channels, are mixed into at least one of a plurality of output channels, which comprises: a first signal path setting section that selects one or more input channels from among the plurality of input channels and makes a setting such that signals of the selected one or more input channels are mixed into a first output channel of a plurality of output channels; an exclusion setting section that sets a particular input channel to be excluded from the plurality of input channels; and a second signal processing section that makes a setting such that the signals of the one or more input channels, selected via the first signal processing section and having the signal of the particular input channel excluded therefrom, are mixed into a second output channel of the plurality of output channels.

The first signal path setting section performs the existing or conventional signal path setting function. Mix-minus signal with respect to a mixed signal, obtained by mixing the signals of the selected one or more input channels into the first output channel in accordance with the setting by the first signal path setting section, can be obtained through the second output channel. Namely, to perform the mix-minus function, the exclusion setting section sets a particular input channel to be excluded from the plurality of input channels. The second signal path setting section excludes the signal of the particular input channel, selected or set by the exclusion setting section, from the input signals of the one or more input channels selected by the first signal path setting section, and it then sets signal paths such that the signals of the remaining (non-excluded) channels are mixed into the second output channel of the plurality of output channels. Namely, because the present invention is arranged to provide "mix-minus" signals via the second output channel by mixing the signals of the one or more input channels, having the signal of the particular input channel excluded therefrom, into the second output channel separate from the first output channel, instead of subtracting the signal of the particular input channel from the signals mixed into the first output channel as in the above-discussed conventional technique. Thus, the present invention can reliably prevent signal quality deterioration of the mix-minus signal obtained via the second output channel.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENT

Figure 1:
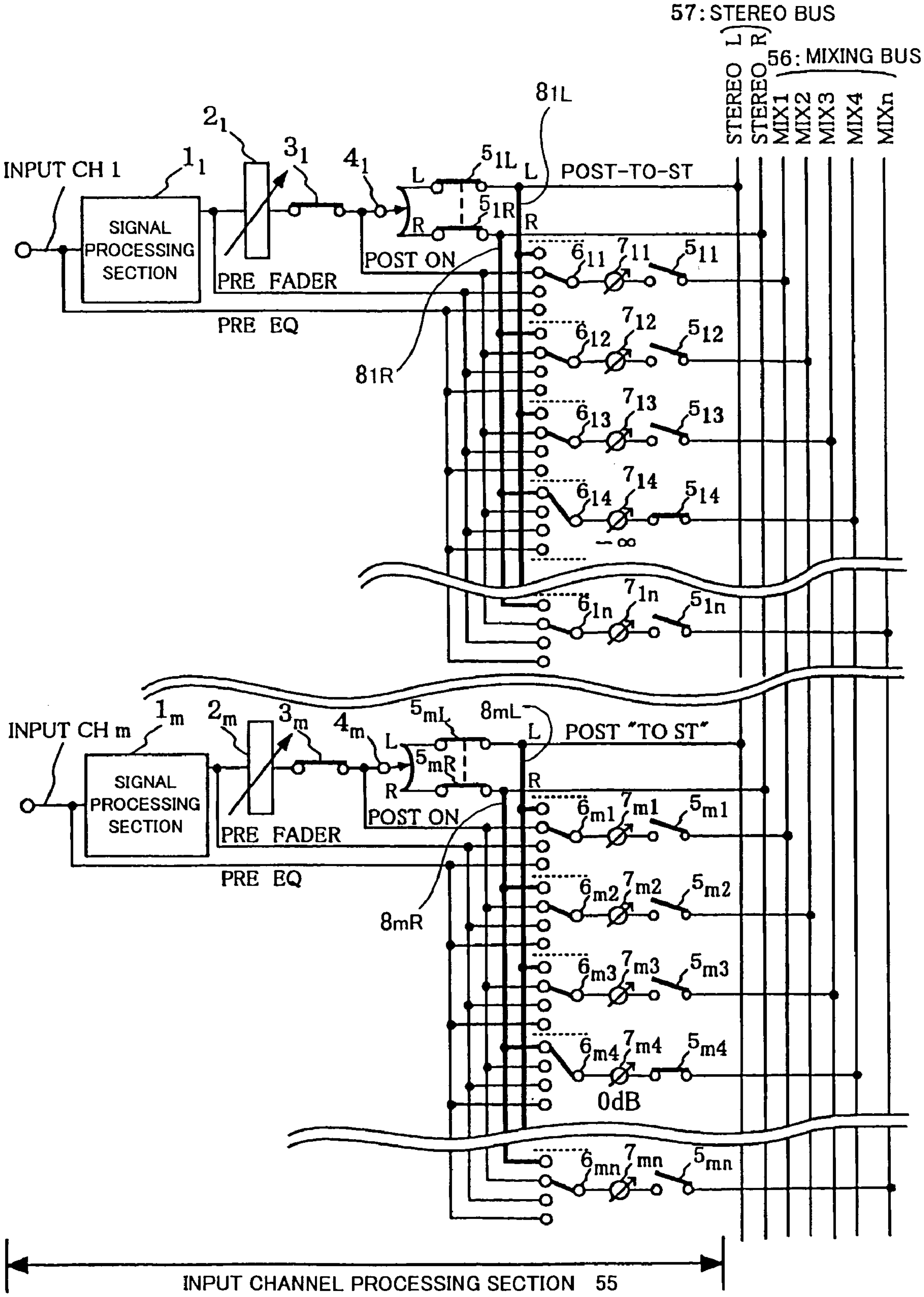
FIG. 1 is a functional block diagram showing signal paths of a mixer in accordance with an embodiment of the present invention.

FIG. 1 is a functional block diagram showing signal paths of a mixer in accordance with an embodiment of the present invention;

In the figure, the mixer includes signal paths $\mathbf{8}_{1L}$, $\mathbf{8}_{1R}$-$\mathbf{8}_{mL}$, $\mathbf{8}_{mR}$ indicated by thick, heavy lines are new additions to the conventionally-known signal paths indicated by thin lines. Various components, such as switches and volume controls, to be described below in relation to the drawings are not actual electrically-connected mechanical component parts, but they just represent various functions.

Reference numerals $\mathbf{1}_1$-$\mathbf{1}_m$ represent signal processing sections, which perform sound quality adjustment on first to m-th input channels. Note that, in some cases, signals at respective input points of the signal processing sections $\mathbf{1}_1$-$\mathbf{1}_m$ are directly sent, as pre-equalizer signals (PRE EQ), to a mixing bus unit 56 having mixing buses MIX1-MIXn.

Reference numerals $\mathbf{2}_1$-$\mathbf{2}_m$ represent faders that perform sound volume adjustment. In some cases, signals at respective input points of the faders $\mathbf{2}_1$-$\mathbf{2}_m$ are capable of being directly sent, as pre-fader signals (PRE FADER), to the mixing bus unit 56.

Reference numerals $\mathbf{3}_1$-$\mathbf{3}_m$ represent post-on switches, which are provided to control whether or not signals having passed through the faders $\mathbf{2}_1$-$\mathbf{2}_m$ are to be coupled to the succeeding mixing bus unit 56 or stereo bus unit 57. Respective output points of the post-on switches $\mathbf{3}_1$-$\mathbf{3}_m$ will be referred to as "post-on" points (POST ON).

Reference numerals $\mathbf{4}_1$-$\mathbf{4}_m$ represent panning (sound image localizing) volume controls, which have their respective sliding contacts connected to the corresponding output points of the post-on switches $\mathbf{3}_1$-$\mathbf{3}_m$.

Reference numerals $\mathbf{5}_{1L}$, $\mathbf{5}_{1R}$-$\mathbf{5}_{mL}$, $\mathbf{5}_{mR}$ represent delivery (SEND) switches for sending signals from the individual input channels to the stereo bus unit 57 ("POST-TO-ST" switches). The delivery (SEND) switches $\mathbf{5}_{1L}$, $\mathbf{5}_{1R}$-$\mathbf{5}_{mL}$, $\mathbf{5}_{mR}$ are connected to L (Left) and R (Right) terminals of the panning (sound image localizing) volume controls $\mathbf{4}_1$-$\mathbf{4}_m$. The L and R terminals are turned on and off in an interlocked manner to control connection/disconnection to/from the stereo bus unit 57. Output points of the post-on switches $\mathbf{3}_1$-$\mathbf{3}_m$ are called "post-to-stereo (POST-TO-ST) points".

Further, reference numerals $\mathbf{6}_{11}$-$\mathbf{6}_{1n}$ represent selection switches for selecting any of output points of the first input channel to the buses MIX1-MIXn of the mixing bus unit 56. Namely, these selection switches $\mathbf{6}_{11}$-$\mathbf{6}_{1n}$ select any of output points (PRE, EQ, PREFADER, POST ON, and POST-TO-ST) of the first input channel.

Regarding the "post-to-stereo (POST-TO-ST) points", the L terminal of the panning volume control $\mathbf{4}_1$ is connected to odd-numbered ones of the output point selection switches $\mathbf{6}_{11}$-$\mathbf{6}_{1n}$, while the R terminal of the panning volume control $\mathbf{4}_1$ is connected to even-numbered ones of the output point selection switches $\mathbf{6}_{11}$-$\mathbf{6}_{1n}$.

Reference numerals $\mathbf{7}_{11}$-$\mathbf{7}_{1n}$ represent send-level volume controls for controlling levels of signals to be sent from the first input channel to the buses MIX1-MIXn of the mixing bus unit 56. Namely, these volume controls adjust signal level allocations to the individual mixing buses MIX1-MIXn.

Reference numerals $\mathbf{5}_{11}$-$\mathbf{5}_{1n}$ represent delivery (SEND) switches for sending signals from the first input channel to the buses MIX1-MIXn of the mixing bus unit 56.

Similarly, reference numerals $\mathbf{6}_{m1}$-$\mathbf{6}_{mn}$ represent send-level volume controls for controlling levels of signals to be sent from the m-th input channel to the buses MIX1-MIXn of the mixing bus unit 56. $\mathbf{5}_{m1}$-$\mathbf{5}_{mn}$ represent delivery (SEND) switches for sending signals from the m-th input channel to the buses MIX1-MIXn of the mixing bus unit 56.

Signals of the individual input channels can be coupled to the buses MIX1-MIXn of the mixing bus unit 56 by way of movable contact terminals of the output point selection switches $\mathbf{6}_{11}$-$\mathbf{6}_{mn}$, send-level volume controls $\mathbf{7}_{11}$-$\mathbf{7}_{1n}$ and delivery (SEND) switches $\mathbf{5}_{11}$-$\mathbf{5}_{mn}$.

Regarding the "post-to-stereo (POST-TO-ST) points", signals from the respective L terminals of the panning volume control $\mathbf{4}_1$-$\mathbf{4}_m$ can be coupled to odd-numbered ones of the buses MIX1-MIXn of the mixing bus unit 56, while signals from the respective R terminals of the panning volume control $\mathbf{4}_1$-$\mathbf{4}_m$ can be coupled to even-numbered ones of the buses MIX1-MIXn.

Figure 5:
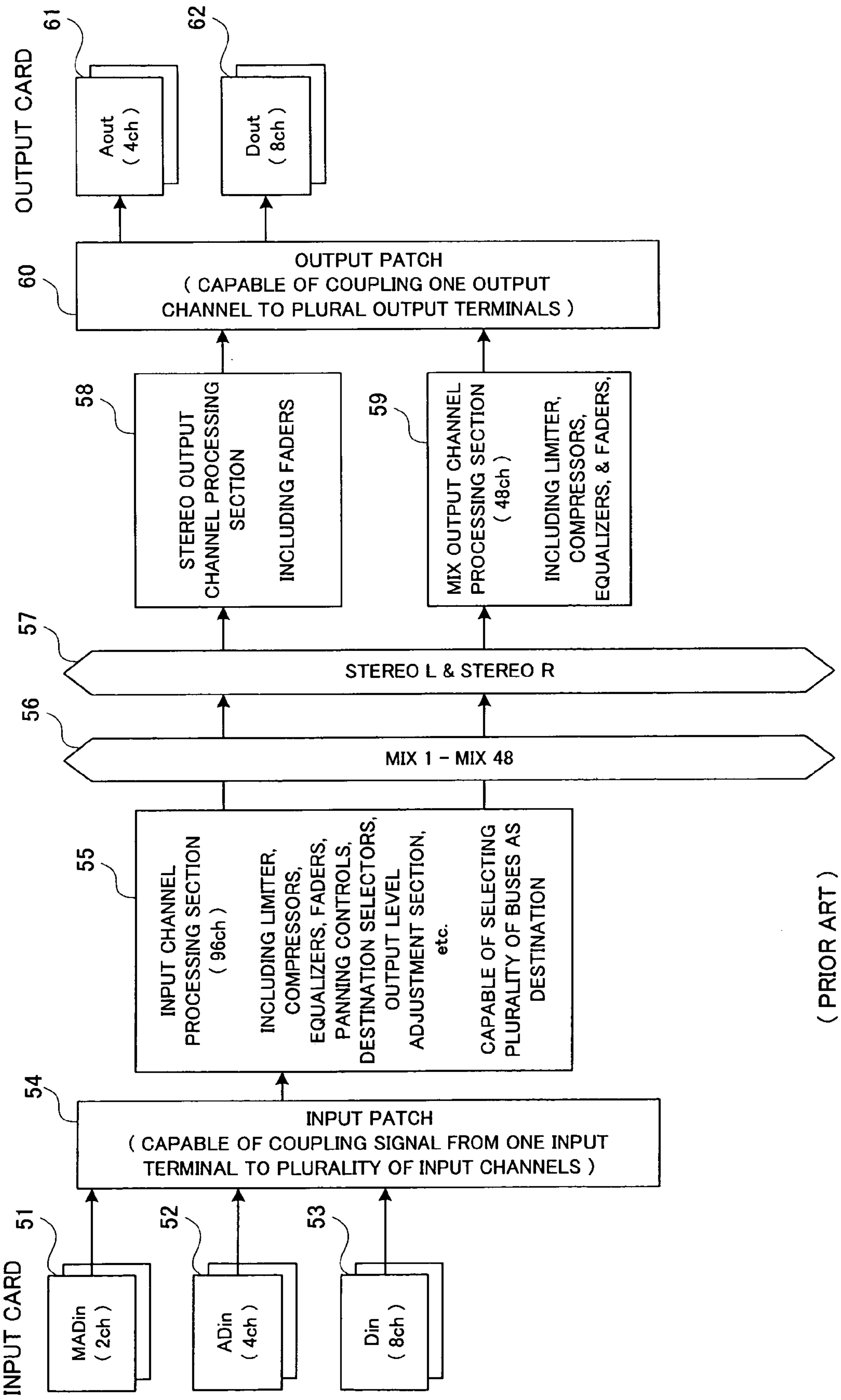
( PRIOR ART ) FIG. 5
FIG. 5 is a system block diagram of an audio mixer conventionally used in halls or event venues.

By setting the respective ON/OFF states of the plurality of delivery switches $\mathbf{5}_{1L}$, $\mathbf{5}_{1R}$, $\mathbf{5}_{11}$-$\mathbf{5}_{1n}$, . . . , $\mathbf{5}_{m1}$-$\mathbf{5}_{mn}$ in the signal paths having been set forth above, signals of a plurality of input channels, selected by a human operator from among the first to m-th input channels and output from an input channel processing section 55, are supplied to buses selected from among the buses (STEREO L and STEREO R) of the stereo bus unit 57 and buses (MIX1-MIXn) of the mixing bus unit 56, so that the signals are mixed via the selected buses and then output to corresponding mix output channels 59 and stereo output channels 58 of FIG. 5.

ON/OFF operations of the above-mentioned delivery switches $5_{1L}$, $5_{1R}$, $5_{11}$-$5_{1n}$, . . . , $5_{m1}$-$5_{mn}$ are performed by signal path setting processing (or signal path setting means) that is executed or implemented by a CPU carrying out program steps.

First signal path setting processing (means) sets signal paths for connecting a plurality of selected input channels to a first broadcasting output bus. The instant embodiment is constructed on the precondition that broadcasting audio signals are output through stereo output channels. Thus, each original mix output channel before the mix-minus function is applied is fixedly set to the stereo output channel (L or R channel). In the illustrated example, one or more input channels, selected via the corresponding delivery (SEND) switches $5_{1L}$, $5_{1R}$. . . $5_{mL,\ 5mR}$ from among the first to m-th input channels, are set as predetermined input channels to be coupled to the original mix output channel. Namely, the one or more selected input channels are coupled to the stereo output channels (i.e., mix output channels corresponding to mixing states before the mix-minus function is applied).

In accordance with an instruction of the operator, a to-be-excluded-input-channel setting section (not shown) sets a particular input channel to be excluded from the predetermined plurality of input channels. In the illustrated example, the first input channel is set as the to-be-excluded input channel.

Further, in accordance with an instruction of the operator, a mix output channel setting section (not shown) sets, as a "mix-minus output channel", another mix output channel than the original mix output channel, from a plurality of mix output channels. The human operator can designate and set the mix-minus output channel for outputting mixed signals with a signal of the to-be-excluded input channel excluded therefrom, from among empty mix output channels or currently-used mix output channels that may be switched to a mix-minus output channel. In the illustrated example, the fourth mix output channel (mixing bus MIX4) is set as the mix-minus output channel.

For the predetermined input channels (in the illustrated example, the first and m-th input channels) selected by the first signal path setting processing (means), a second signal path setting processing (means) sets a signal path for connecting every input channel (in the illustrated example, the m-th input channel) other than the to-be-excluded input channel (in the illustrated example, the first input channel) to the mixing bus MIX4 of the second mix output channel (in the illustrated example, the fourth output channel) separate from the first mix output channels (in the illustrated example, stereo output channels).

Namely, in the illustrated example, the second signal path setting processing (means) sets a signal path passing the output point selection switch $6_{m4}$, send-level control volume $7_{m4}$ (0 dB gain) and delivery switch $5_{m4}$ corresponding to the mixing bus MIX4. On the other hand, a signal path passing the output point selection switch $6_{14}$, send-level control volume $7_{m4}$ ($-\infty$ dB gain) and delivery switch $5_{14}$ corresponding to the mixing bus MIX4 will not substantially work because the gain is completely eliminated.

Operation of the aforementioned second signal path setting processing (means) will be later described in detail with reference to FIG. 3.

Figure 2:
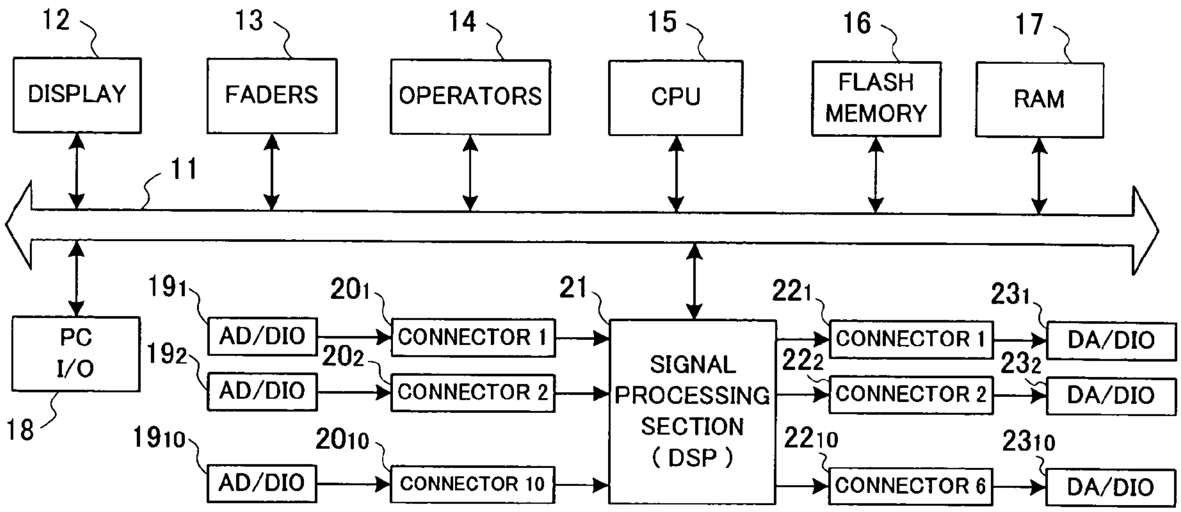
FIG. 2 is a block diagram showing a general hardware setup of the embodiment of the present invention.

FIG. 2 is a block diagram showing a general hardware setup of the embodiment of the present invention.

The embodiment includes a CPU 15 that controls the audio mixer using operation programs and various setting data, such as patch data, stored in a flash memory 16 and using a RAM 17 as a working area.

More specifically, via a bus 11, the CPU 15 detects operation of individual faders 13 and operators 14 on a console panel, receives an instruction from the human operator, and makes settings to cause a signal processing section 21 to perform mixing operations. The CPU 15 also controls a display device 12 by creating display screens, and controls fader motors etc. The CPU 15 also displays operators on the display screen to allow operation via GUI (Graphical User Interface).

Further, as settings for the individual input channels in the signal processing section 21, the CPU 15 makes settings of effects, faders, output destinations, output levels, etc. As settings for the individual output channels, the CPU 15 makes settings of effects, faders, etc. The above-mentioned settings include those of the signal paths shown in FIG. 1. The thus-made settings can be collectively stored in the flash memory 16 as "scene data" in such a manner that the panel settings can be collectively read out as necessary.

Reference numerals $19_1$-$19_{10}$ represent analog-to-digital conversion boxes with respective digital interface boxes. These analog-to-digital conversion boxes with the respective digital interface boxes $19_1$-$19_{10}$ are connected to the signal processing section 21 via corresponding connectors $20_1$-$20_{10}$. Input cards as shown in FIG. 5 are inserted in the analog-to-digital conversion boxes. Reference numerals $23_1$-$23_{10}$ represent digital-to-analog conversion boxes with respective digital interface boxes. These analog-to-digital conversion boxes with the respective digital interface boxes $23_1$-$23_{10}$ are connected to the signal processing section 21 via corresponding connectors $22_1$-$22_{10}$. Output cards as shown in FIG. 5 are inserted in the digital-to-analog conversion boxes.

The signal processing section 21 is, for example, in the form of a DSP (Digital Signal Processor). The CPU 15 sets various values, signal paths, etc., and it selectively mixes signals input via a plurality of desired input terminals and then outputs the mixed signals via desired output terminals. Because a plurality of mixing processing can be performed concurrently, similar operations are carried out even in the case where there is a to-be-excluded input channel.

The bus 11 includes an interface (PC I/O) 18 for connection with an external personal computer or the like. For example, the external personal computer can display, on its display device, a display screen similar to that of the display device 12 and can also make settings for the signal processing section 21 in a similar manner to the CPU 15.

The CPU-operating control programs and setting data, stored in the flash memory 16, can be rewritten. Desired control program or setting data may be installed using a not-shown external storage device, such as a memory card or CD-ROM, or may be downloaded via the interface (PC I/O) 18 from a server computer on a communication network.

Figure 3:
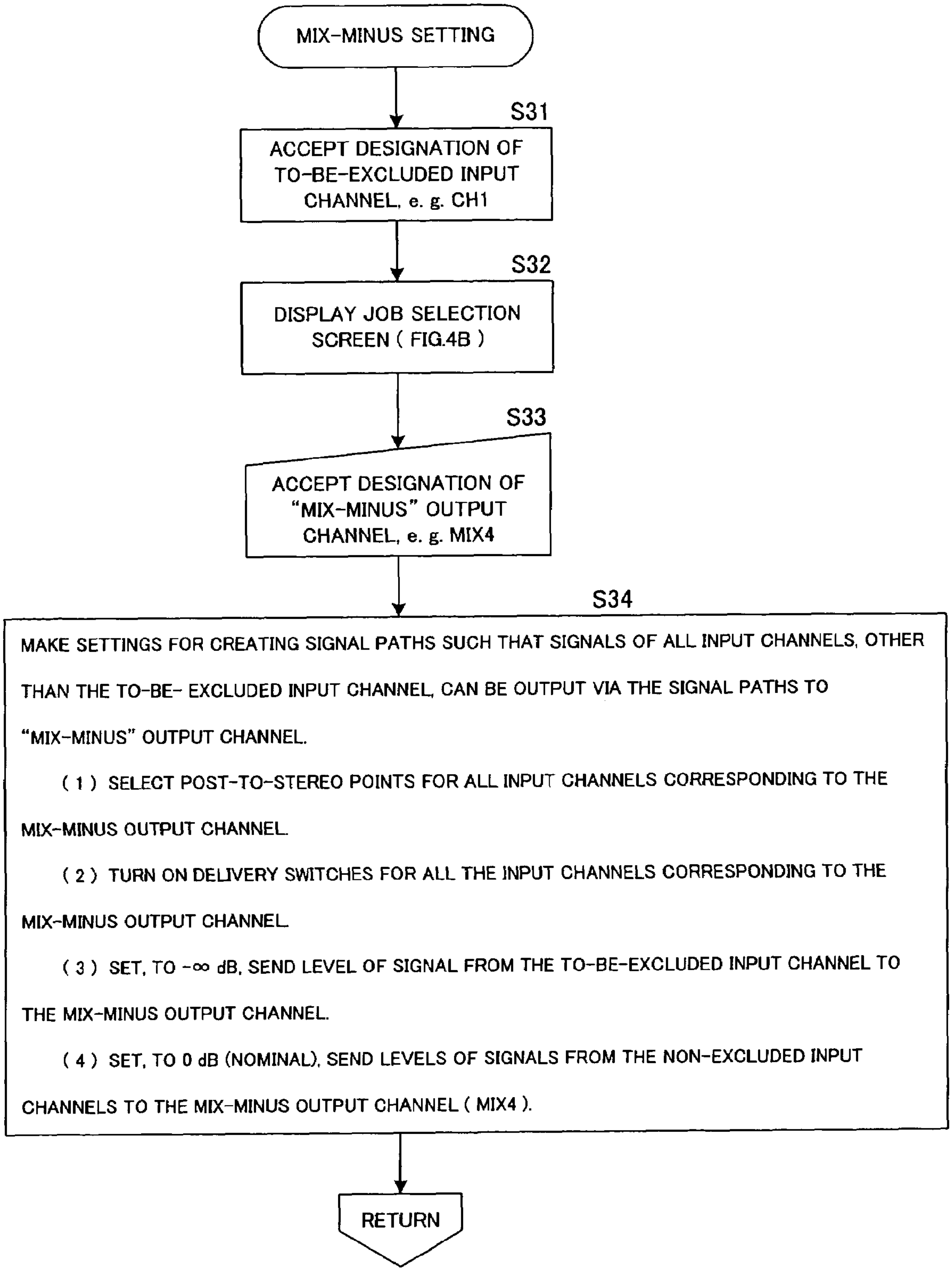
FIG. 3 is a flow chart showing an example of processing performed in the instant embodiment.

FIG. 3 is a flow chart showing an example of processing performed in the instant embodiment. Various steps for making "mix-minus" settings are carried out by the CPU 15 of FIG. 2 or external personal computer in accordance with the control program.

Figure 4A:
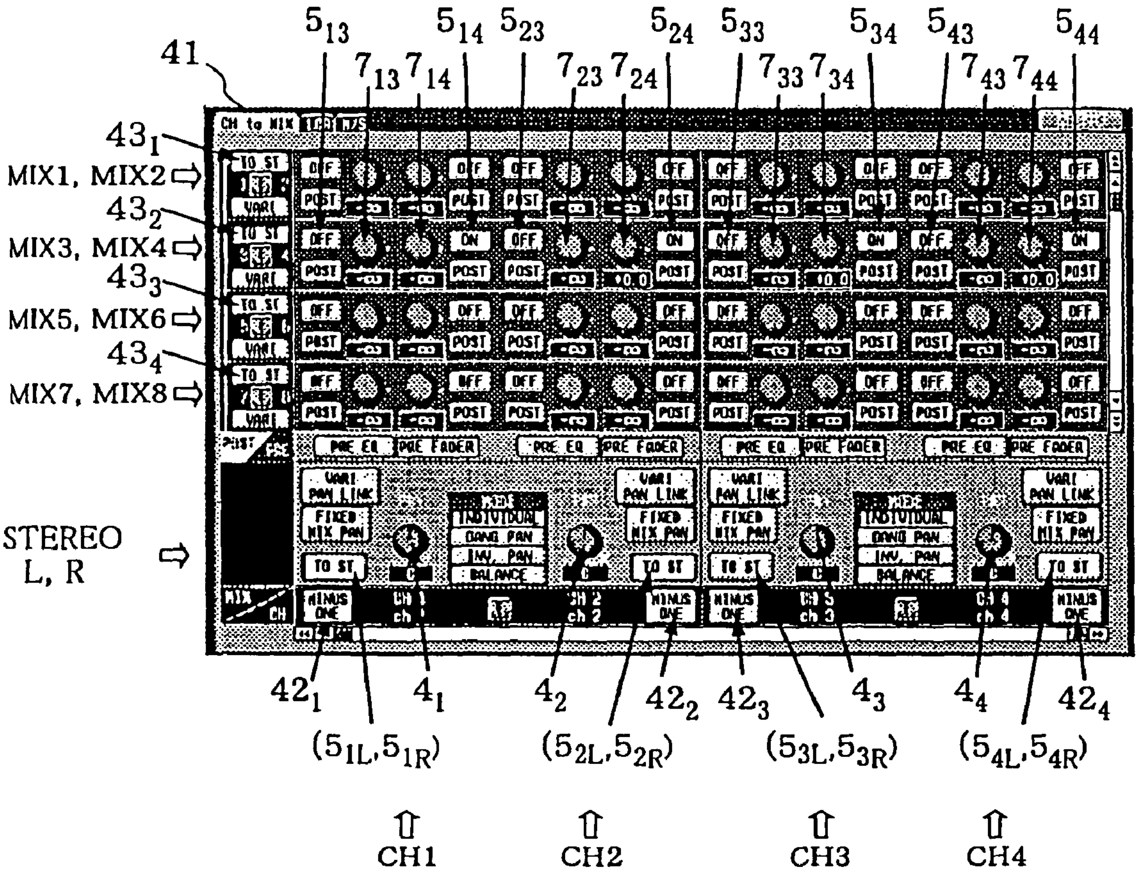
FIGS. 4A and 4B diagrams showing examples of "mix-minus" setting screens.
Figure 4B:
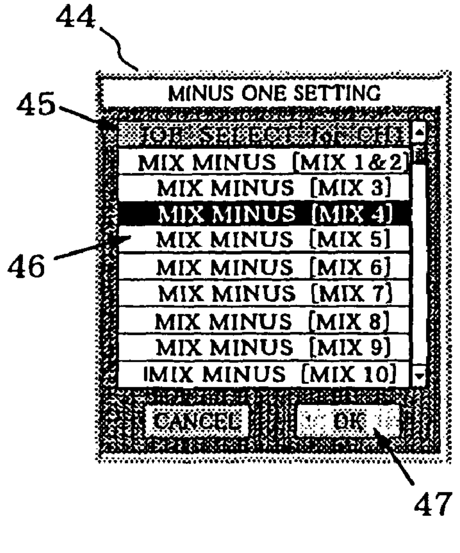

FIGS. 4A and 4B show examples of "mix-minus" setting screens, portions of which are not pertinent to the present invention and therefore will not be described. FIG. 4A shows an example of a "channel-to-mix" display screen 41, while FIG. 4B shows an example of a job selection screen 44.

On the "channel-to-mix" display screen 41 of FIG. 4A, the input channels from which signals are sent ("sent-from channels") are arranged in a horizontal direction while the mix output channels (mixing buses) are arranged in a vertical direction. Note that the mix output channels are arranged in the vertical direction in pairs of even-numbered and odd-numbered ones placed side by side. Displayed range can be moved by the human operator operating a scroll bar.

($5_{1L}$, $5_{1R}$), ($5_{2L}$, $5_{2R}$), ($5_{3L}$, $5_{3R}$), ($5_{4L}$, $5_{4R}$), $5_{13}$, $5_{14}$, $5_{23}$, $5_{24}$, $5_{33}$, $5_{34}$, $5_{43}$ and $5_{44}$ represent delivery (SEND) switches, $4_1$, $4_2$, $4_3$ and $4_4$ represent panning volume controls, and $7_{13}$, $7_{14}$, $7_{23}$, $7_{24}$, $7_{33}$, $7_{34}$, $7_{43}$ and $7_{44}$ represent send-level volume controls, which correspond to the delivery switches, panning volume controls and send-level volume controls of FIG. 1.

Further, reference numerals $42_1$-$42_4$ represent mix-minus buttons operable to set a to-be-excluded input channel. Reference numerals $43_1$-$43_4$ represent post-to-stereo buttons corresponding to the output point section switches of FIG. 1 for selecting a "post-to-stereo (POST-TO-ST) point". In the illustrated example, the mix-minus buttons $42_1$-$42_4$ are displayed in a displayed position of the to-be-excluded input channel.

In the illustrated example, the post-to-stereo buttons $43_1$-$43_4$ are displayed in display positions of the mix output channels corresponding to connecting destinations from the post-to-stereo output points. The arrangement in the illustrated example of FIG. 4 is slightly differ from that of the output point selection switches $6_{11}$-$6_{mn}$ of FIG. 1 in that the connecting destinations from the post-to-stereo output points are pairs of odd-numbered and even-numbered mix output channels. Therefore, one of the paired odd-numbered and even-numbered mix output channels, to which the post-to-stereo output point is connected, is the "mix-minus" output channel.

The processing flow-charted in FIG. 3 is started up by the human operator clicking one of the mix-minus buttons $42_1$-$42_4$, . . . , $42_m$ after displaying the "channel-to-mix" display screen 41 of FIG. 4A. The processing can also be started up by operation of a predetermined operator on the mixing console.

When the mix-minus button $42_1$ has been clicked by the human operator, the first input channel CH1 is set as a to-be-excluded input channel at step S31.

At next step S32, the job selection screen 44 of FIG. 4B is displayed as a pop-up screen, where "CH1" is displayed in its to-be-excluded input channel display section 45.

At step S33, the human operator clicks one mix output channel (e.g., mixing bus MIX4) from a mixing bus list 46. Then, once the user clicks an "OK" button, designation of the mix-minus output channel is accepted. If the input channels and output channels are set in advance in pairs (e.g., MIX1 and MIX2), then the designation is accepted as the pair.

At step S34, settings are made for creating signal paths such that signals of all input channels, other than the to-be-excluded input channel, having been set to be coupled to the stereo bus unit 57 can be output via the signal paths to the mix-minus output channel.

Specifically, signal path settings are made as described in items (1)-(4) within a rectangular box of step S34.

(1) Settings are made such that the output point selection switches $6_{14}$, $6_{24}$, $6_{34}$, . . . , $6_{m4}$ of all the input channels corresponding to the mix-minus output channel (mixing bus MIX4) select post-to-stereo points via which a listener is listening to broadcast sounds. In the illustrated example of FIG. 4, the paired output point selection switches (e.g., $6_{13}$, $6_{14}$) are both shown as selecting the post-to-stereo points.

(2) For all of the input channels corresponding to the mix-minus output channel (mixing bus MIX4), the delivery switches $5_{14}$, $5_{24}$, $5_{34}$, $5_{44}$, . . . , $5_{m4}$ are turned on.

(3) Send level of the send level volume control $7_{14}$ from the to-be-excluded input channel (CH1) to the mix-minus output channel (MIX4) is set to "$-\infty$ dB".

(4) Send levels of the send level volume controls $7_{24}$, $7_{34}$ and $7_{44}$ from the non-excluded input channels to the mix-minus output channel (MIX4) are set to 0 dB (nominal level).

Because, in the instant embodiment, the mix-minus signal path setting operations select a plurality of predetermined input channels connected to the stereo bus unit 57 (provides the post-to-stereo points as the output points), they partially include signal paths corresponding to the original signal path settings. Next, of such input channels, every input channel other than the to-be-excluded input channel is connected to the mix-minus output channel. Because such setting operations are interlocked with the original signal path settings, they can be performed with considerable simplicity. Namely, because signal delivery settings by the corresponding delivery switches $5_{1L}$, $5_{1R}$. . . $5_{mL}$, $5_{mR}$ in the original signal paths are reflected in delivery settings of signals to the mix-minus output channel, the instant embodiment can eliminate a need to separately make signal delivery settings corresponding to the signal delivery settings in the original signal paths.

When the human operator selects a to-be-excluded input channel, there may be imposed limits in advance such that the to-be-excluded input channel is selected from among a plurality of predetermined input channels connected to the stereo bus unit 57. Even if the selected to-be-excluded input channel is not among a plurality of predetermined input channels, the signal path set in the instant embodiment can be effectively prevented from malfunctioning.

Note that, on the channel-to-mix screen 41 of FIG. 4A, the human operator can also set the output point as the point-to-stereo point by directly clicking the post-to-stereo button $43_4$.

In the illustrated example, the gain of the send level volume control $7_{14}$ on the signal connecting path is completely minimized to "$-\infty$ (dB)" so as to prevent a connection between the to-be-excluded input channel and the mix-minus output channel. In an alternative, the delivery switch $5_{14}$ may be turned off to prevent the connection between the to-be-excluded input channel and the mix-minus output channel Alternatively, if the to-be-excluded input channel is among the plurality of predetermined input channels connected to the stereo output channels, there may be set a signal path connecting to the mix-minus output channel, by attenuating the signal level of the to-be-excluded input channel by a predetermined amount instead of completely cutting out the signal level. Namely, the signal level of the to-be-excluded input channel may be attenuated by a predetermined amount via the send level volume control $7_{14}$ in such a manner that an announcer can hear his or her voice with a low volume.

Further, two mix-minus modes may be provided. Namely, there may be provided a first mix-minus mode in where every one of a plurality of predetermined input channels, other than the to-be-excluded input channel, is connected to the mix-minus output channel and a second mix-minus mode in where all of the predetermined input channels are connected to the mix-minus output channel, so that a mode designating section can switch between the first and second mix-minus modes as necessary.

The signal path settings shown in FIG. 1 are merely illustrative. What is essential to the present invention is that the mix-minus function as having been set forth above is achieved through signal path settings between the input channels and the mix output channels.

For example, whereas, in the above-described embodiment, the L terminal or R terminal of the post-to-stereo points is set as the output point, there may be provided further switches at the L and R terminals of the panning volume control $4_1$-$4_n$, to set the L and R terminals of each of the further switches as an output point. The further switches are turned on or off in response to operating states of the corresponding delivery switches (POST-TO-STEREO switches) $5_{1L}$ and $5_{1R}$ (in response to original signal path settings).

As another alternative, there may be provided a further switch at each of the POST ON points to set the output of the further switch as an output point. The further switch is turned on or off in response to operating states of the corresponding delivery switches (POST-TO-STEREO switches) $5_{1L}$ and $5_{1R}$ (in response to original signal path settings). The output of the further switch is connectable to all of the buses MIX1-MIXn of the mixing bus unit 56. In this case, there can be provided monitoring sounds that are not influenced by the settings of the panning volume controls, although the monitoring sounds would differ because they bypass the panning volume controls.

Note that various pieces of parameter information, indicative of the input channels connected to the original mix output channels before the mix-minus processing, output points and send levels of the input channels, etc. are prestored in the flash memory 16. Thus, the mix-minus function may also be performed, by copying the parameter information to the mix minus output channel and then turning off the delivery switch or completely or incompletely attenuating the send level of the to-be-excluded input channel.

In this case, signal paths for normal mixing and signal paths for mix-minus processing coexist between the inputs and outputs in the mixer of FIG. 1.

In the embodiment described above, the mix-minus processing is performed on signals to be supplied to the stereo output channels (stereo bus). Alternatively, any desired mix output channels (mixing bus) may be set as channels on which the mix-minus processing is to be performed.

Further, whereas the embodiment has been described as performing the mix-minus processing on only one of a pair of post-to-stereo output points L and R, the mix-minus processing may be performed simultaneously on both of the pair of post-to-stereo output points L and R. In such a case, let it be assumed that the mixing bus MIX 4 to be used for the mix-minus function is composed of two stereo channels; thus, the mix-minus function can be performed for stereo monitoring outputs.

New display screen is created with the above-described “mix-minus” mixing signal-path settings reflected therein, and then the thus-created display screen is displayed. The channel-to-mix display screen 41 of FIG. 4A is one having already been subjected to the setting change.

Before the setting change, the delivery switches ($\mathbf{5}_{1L}$, $\mathbf{5}_{1R}$), ($\mathbf{5}_{2L}$, $\mathbf{5}_{2R}$) are in the ON display state (depressed state indicated in green color on the screen), and signals of the first and second input channels are output to the stereo channels in a mixed condition.

For example, after the setting change, the mix-minus button $\mathbf{42}_1$ is set to the ON display state (depressed state indicated in green color), the post-to-stereo button $\mathbf{43}_2$ is set to the ON display state (depressed state indicated in green color), and the delivery switches $\mathbf{5}_{14}$, $\mathbf{5}_{24}$, $\mathbf{5}_{34}$, $\mathbf{5}_{44}$ are set to the ON display state (depressed state indicated in green color). Further, the send level display of the send level volume control $\mathbf{7}_{14}$ is set to “−∞”, and the send level display of the send level volume controls $\mathbf{7}_{24}$, $\mathbf{7}_{34}$, $\mathbf{7}_{44}$, . . . is set to “0”.

Because of the nature of the “channel-to-mix” display screen 41, where the operators and operating states of the volume controls, forming signals paths among a plurality of input channels, stereo output channels and mix output channels, are displayed, and thus settings of “mix-minus” mixing signal-paths are displayed in overlapping relation to the operators and operating states of the volume controls.

Further, in the illustrated example of FIG. 4A, pairs of the even-numbered and odd-numbered mix output channels are displayed, so that one of the mix-minus output channels (channel “4”) can be identified by viewing the ON displays of the post-to-stereo buttons $\mathbf{43}_1$-$\mathbf{43}_4$ and delivery switches $\mathbf{5}_{14}$, $\mathbf{5}_{24}$, $\mathbf{5}_{34}$ and $\mathbf{5}_{44}$.

In summary, the present invention can advantageously achieve exclusion of signals of a particular input channel without degrading sound quality, by merely modifying the existing or conventional signal-coupling setting function.

The present invention relates to the subject matter of Japanese Patent Application No. 2002-227028 filed on Aug. 5, 2002, the disclosure of which is expressly incorporated herein by reference in its entirety.

What is claimed is:

1. A mixing signal-path setting apparatus for making a setting of a signal path in an audio mixing system, said audio mixing system comprising a plurality of input channels and a plurality of output channels, said audio mixing system performing signal mixing by connecting each of plural input channels, selected from the plurality of input channels, to at least one output channel selected for the input channel from among the plurality of output channels, said mixing signal-path setting apparatus comprising:

a first signal path setting section that selects plural input channels from among the plurality of input channels and makes a setting such that signals of the selected plural input channels are mixed into a first output channel selected from among said plurality of output channels, so that signals, obtained by mixing the signals of all of the selected plural input channels, are outputted via said first output channel;

an exclusion setting section that selects a particular input channel, from among the selected plural input channels, to be excluded; and a second signal path setting section that makes a setting such that the signals of said plural input channels selected via said first signal path setting section, having the signal of the particular input channel selected by said exclusion setting section excluded therefrom prior to mixing in a second output channel of the plurality of output channels, are mixed in said second output channel, so that signals, obtained by mixing the signals of the selected plural input channels with the particular input channel excluded therefrom, are outputted via said second output channel.

2. A mixing signal-path setting apparatus as claimed in claim 1 which further comprises an output channel setting section that sets, as said second output channel, a desired one of the plurality of output channels other than said first output channel.

3. A mixing signal-path setting apparatus as claimed in claim 1 wherein said exclusion setting section selects the particular input channel to be excluded from the plurality of input channels and cuts the signal of the selected particular input channel so as to prevent the signal of the selected particular input channel from being led to said second output channel.

4. A mixing signal-path setting apparatus as claimed in claim 1 wherein said exclusion setting section selects the particular input channel to be excluded from among the plurality of input channels and lowers the signal of the selected particular input channel to a small level so as to allow the signal of the selected particular input channel to be mixed into said second output channel at a small level.

5. A mixing signal-path setting apparatus as claimed in claim 1 which further comprises a mixing processing device that performs mixing processing on audio signals inputted via the input channels and outputs the audio signals, having been subjected to the mixing processing, to the output channels.

6. A mixing signal-path setting apparatus as claimed in claim 1 wherein said first signal path setting section includes a plurality of switches, provided in corresponding relation to the plurality of input channels, for making settings such that the signals of the input channels are mixedly outputted to a predetermined first output channel, and, in accordance with the settings made by said switches, the signals of the input channels corresponding to said switches are set to be mixed into said predetermined first output channel, and where said second signal path setting section includes a branch for branching the signals of the input channels, having been set via said switches to be mixed into said predetermined first output channel, and the signals of the input channels, having the signal of the particular input channel excluded therefrom by means of said branch, are mixed into a predetermined second output channel of the plurality of output channels.

7. A mixing signal-path setting apparatus as claimed in claim 1 wherein said first output channel comprises a predetermined pair of mixing buses, wherein said first signal path setting section includes a plurality of switches, provided in corresponding relation to the plurality of input channels, for making settings such that the signals of the input channels are outputted to said predetermined pair of mixing buses, and, in accordance with the settings made by said switches, the signals of the input channels corresponding to said switches are set to be mixed into said predetermined pair of mixing buses, and where said second signal path setting section includes a branch for branching the signals of the input channels, having been set via said switches to be mixed into said predetermined pair of mixing buses, to one of the mixing buses, and the signals of the input channels, having the signal of the particular input channel excluded therefrom by means of said branch, are mixed into the one mixing bus.

8. A mixing signal-path setting apparatus as claimed in claim 1 wherein said exclusion setting section mixes respective signals of the plurality of input channels into said second output channel via level adjusting devices, and a signal level of a desired one of the input channels is suppressed via the level adjusting device of the desired input channel so that the desired input channel is set as the particular input channel to be excluded.

9. A mixing signal-path setting apparatus as claimed in claim 1 wherein said second signal path setting section adjusts the signals of the input channels, other than the particular input channel to be excluded, to predetermined levels and then mixes the adjusted signals into said second output channel.

10. A mixing signal-path setting apparatus for making a setting such that signals of one or more input channels selected from among a plurality of input channels are mixed into at least one of a plurality of output channels, said mixing signal path setting apparatus comprising:

a first signal path setting section that selects one or more input channels from among the plurality of input channels and makes a setting such that signals of the selected one or more input channels are mixed into a first output channel of a plurality of output channels;

an exclusion setting section that set s a particular input channel, from the selected plural input channels, to be excluded;

a second signal path setting section that makes a setting such that the signals of the one or more input channels selected via said first signal path setting section, having the signal of the particular input channel set by said exclusion setting section excluded therefrom prior to mixing in a second output channel of the plurality of output channels, are mixed in said second output channel; and a section that provides a visual display to be used for setting various parameters for mixing signal paths.

11. A mixing signal-path setting apparatus as claimed in claim 10 wherein, when the various parameters are to be set via the display, said second signal path setting section automatically performs a switching operation necessary for mixing the signals of the input channels, having the signal of the particular input channel excluded therefrom, into said second output channel, and said second signal path setting section also automatically performs necessary signal level adjustment in connection with the switching operation.

12. A mixing signal-path setting apparatus as claimed in claim 1 which further comprises a storage section that stores information indicative of at least a portion of the settings made by said first signal path setting section, said exclusion setting section and said second signal path setting section, and wherein the information stored in said storage section is read out to reproduce at least a portion of the settings made by said first signal path setting section, said exclusion setting section and said second signal path setting section.

13. A computer readable medium storing a program for causing a computer to set a signal path in an audio mixing system, said audio mixing system comprising a plurality of input channels and a plurality of output channels, said audio mixing system performing signal mixing by connecting each of plural input channels, selected from the plurality of input channels, to at least one output channel selected for the input channel from among the plurality of output channels, said program comprising:

a first signal path setting step of selecting plural input channels from among a plurality of input channels and making a setting such that signals of the selected plural input channels are mixed into a first output channel selected from among said of output channels, so that signals, obtained by mixing the signals of all of the selected plural input channels, are outputted via said first output channel;

an exclusion setting step of selecting a particular input channel, from among the selected plural input channels, to be excluded; and a second signal path setting step of making a setting such that the signals of said plural input channels selected via said first signal path setting step, having the signal of the particular input channel selected by said exclusion setting step, excluded therefrom prior to mixing in a second output channel of the plurality of output channels, are mixed in said second output channel, so that signals, obtained by mixing the signals of the selected plural input channels with the particular input channel excluded therefrom, are outputted via said second output channel.

* * * * *